May 24, 1960 L. GRAHAM 2,937,450
WEB MEASURING TABLE
Filed Aug. 14, 1958 2 Sheets-Sheet 1
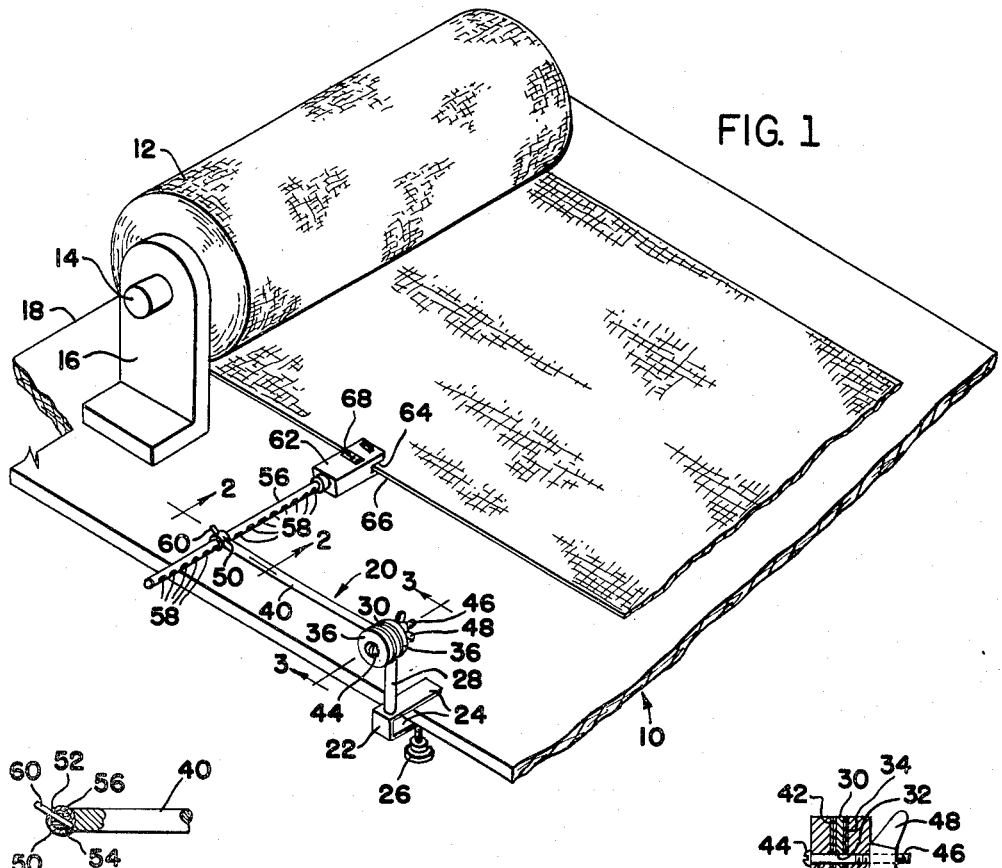
FIG. 1
FIG. 2
FIG. 3
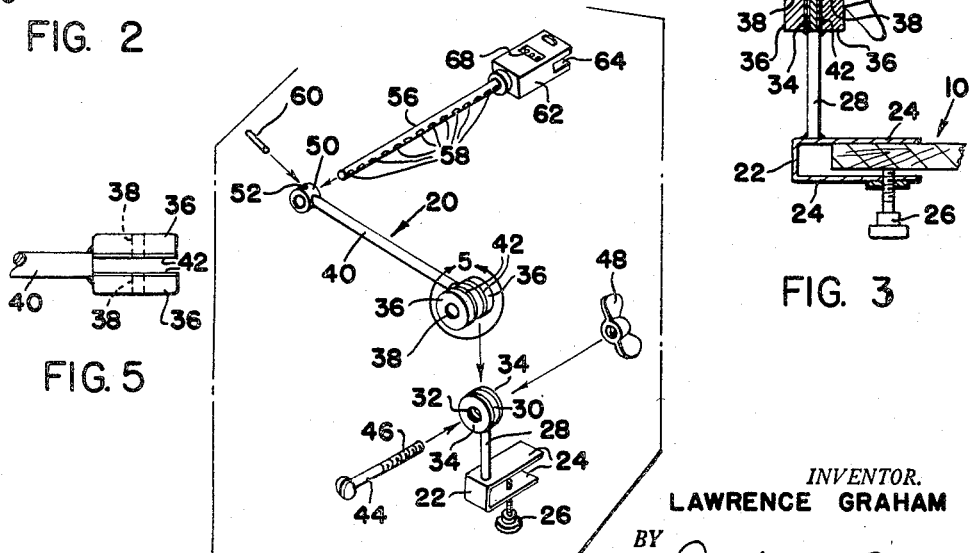
FIG. 5
FIG. 4
INVENTOR.
LAWRENCE GRAHAM
BY
Arthur H. Seidel
ATTORNEY INVENTOR.
LAWRENCE GRAHAM
BY Arthur H. Seidel
ATTORNEY

United States Patent Office 2,937,450
Patented May 24, 1960

2,937,450

WEB MEASURING TABLE

Lawrence Graham, 65 Heatherdell Road, Ardsley, N.Y.

Filed Aug. 14, 1958, Ser. No. 754,969

5 Claims. (Cl. 33—129)

The present invention is directed to a web measuring table, and more particularly to a table in which length measurements on bolts of cloth, and other web materials may be readily made, and accommodation may be readily had to different widths.

There has been a long felt need in the clothing industry, in retail establishments handling piece goods, and in the establishments of manufacturers of piece goods for a table of simple construction which will enable the length of piece goods being taken from a bolt to be accurately determined. For example, it has long proved desirable to provide a spreader table in which accurate control as to the length of piece goods being worked upon could be maintained.

The problem of devising an accurate, simple, and fool-proof web measuring table is a difficult one. Thus, it is desirable that a satisfactory web measuring table be able to measure webs of different widths. Furthermore, it is desirable that the web measuring table comprise measuring means which is as light, small, and compact as possible, in order not to interfere with the general operation of the table, which may be used, for example, as a spreading table.

Moreover, a web measuring table which measures a web that is dispensed from a spindle, as for example a spool mounted on a trunnion, must accommodate to the varying height of the web above the table as the web is run off from its spindle.

This invention has as an object the provision of a novel web measuring table.

This invention has as another object the provision of a web measuring table which includes relatively small and compact measuring means, and yet which is capable of measuring varying widths of web spaced at varying heights above the surface of the table.

This invention has as still another object the provision of a novel spreader table.

Other objects will appear hereinafter.

For the purpose of illustrating the invention there are shown in the drawings forms which are presently preferred; it being understood, however, that this invention is not limited to the precise arrangements and instrumentalities shown.

Referring to the drawings wherein like reference characters refer to like parts:

Figure 1 is a perspective view revealing a presently preferred embodiment of the web measuring table of the present invention, with parts cut away for ease of illustration.

Figure 2 is a section taken on line 2—2 of Figure 1.

Figure 3 is a section taken on line 3—3 of Figure 1.

Figure 4 is an exploded view of the measuring means of the web measuring table of the present invention.

Figure 5 is an enlarged view of the portion of Figure 4 disposed within the split circle designated 5.

Figure 6:
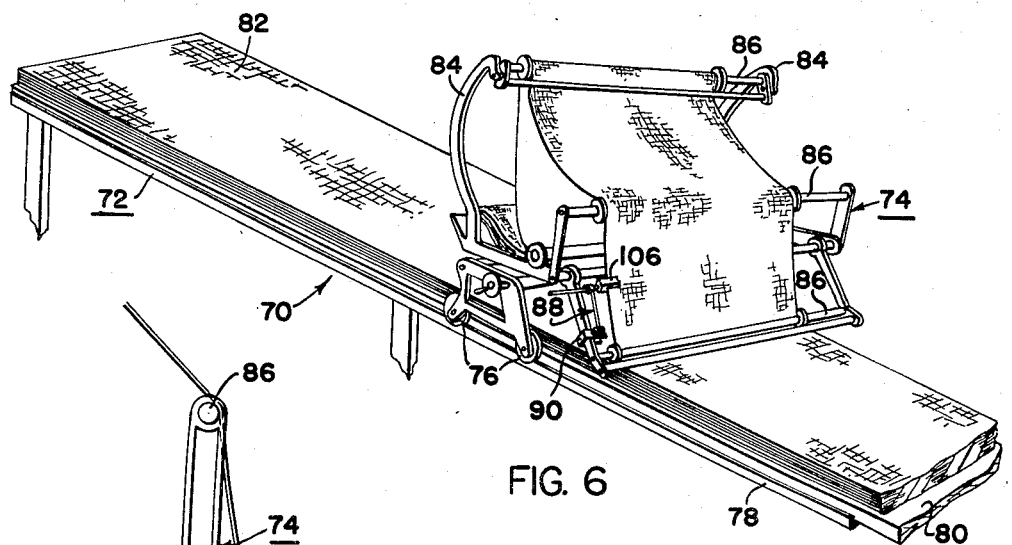
Figure 6 is a fragmentary perspective view of a spreader table comprising a modified embodiment of the present invention.
Figure 7:
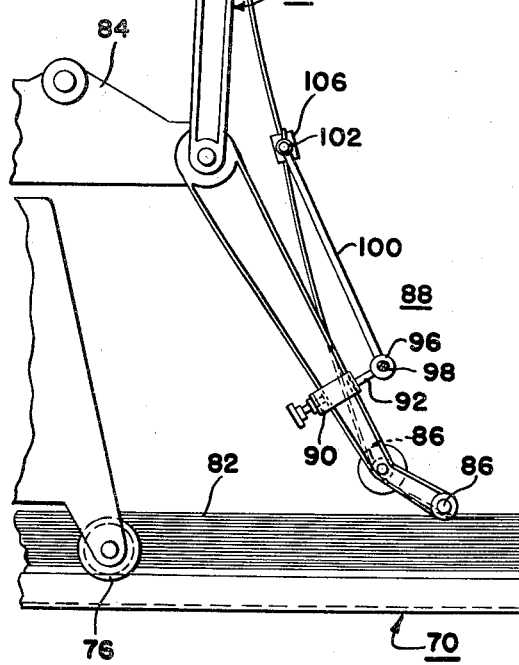
Figure 7 is a fragmentary side elevational view of the embodiment of Figure 6.
Figure 8:
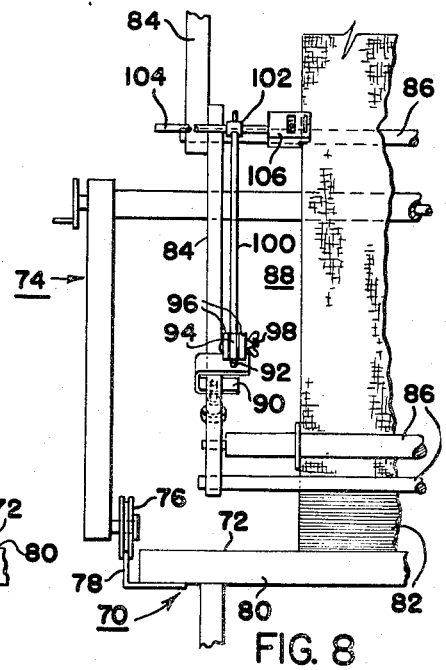
Figure 8 is a fragmentary front elevational view of the embodiment of Figure 6.

Referring to the drawings, and initially to Figures 1 through 5 inclusive, the web measuring table of the present invention is designated generally as 10. In the illustrated embodiment, the web measuring table 10 measures the yardage of cloth delivered from the spool of cloth 12 which is mounted on opposed trunnions 14 which are rotatably carried by the posts 16 which may be positioned adjacent one end 18 of the web measuring table 10.

The length measuring means designated generally as 20 is mounted on the table 10 a spaced distance from the posts 16. In the illustrated embodiment comprising a straight edged table 10, the length measuring means 20 is secured to the table 10 by means of the clamp 22. Thus, the table 10 is received intermediate the fingers 24 and 24 of clamp 22, and the clamp 22 is secured in place by the tightening of clamp screw 26.

It is to be understood that other means for clamping the length measuring means 20 may be used. For example, in tables having tubular sides, clamping means which anchor within holes drilled in the tubular sides may be used.

The upright 28 is fixedly secured to the clamp 22 and extends vertically upwardly therefrom.

The upright 28 carries at its uppermost end a circular disc 30 which is provided with an axial bore 32 at its center. Each of the faces 34 of circular disc 30 is surfaced with a high friction lining, such as the molded or woven materials used for brake linings. The friction faces 34 may be applied to the circular disc 30 as pads.

The circular disc 30 is received intermediate mating circular discs 36 and 36, each of which is provided with a bore 38 passing through its axial center. The circular discs 36 and 36 are secured to the end of rod 40 in spaced juxtaposition. The inside faces 42 of the circular discs 36 and 36 are each provided with a friction face of similar material to the friction face material on each of the friction faces 34 of circular disc 30.

The circular discs 30 and 36 are maitnained in juxtaposed alignment with the circular disc intermediate the discs 36 by the bolt 44 which passes through the bores 38 in the discs 36 and the bore 32 in the disc 30. The free end portion 46 of bolt 44 is threaded and carries the wing nut 48.

The end of rod 40 opposite to the circular discs 36 is provided with a fixedly secured sleeve 50 which is disposed generally normal to the longitudinal axis of the rod 40. The sleeve 50 is provided with a pair of aligned openings, namely the opening 52 which extends through the wall of sleeve 50 and the blind opening 54, which is opposite to the opening 52.

The rod 56 having an outside diameter such that it may be received within the sleeve 50 extends through the sleeve 50. The rod 56 is provided with perforations 58 which are axially spaced along its length. The rod 56 may be positioned at any desired position in respect to the sleeve 50 by inserting the pin 60 through the opening 52 in sleeve 50, an aligned perforation 58 in rod 56, and into the blind opening 54 in sleeve 50.

In place of the sleeve 50 other clamping means for selectively locking the rod 56 in a desired disposition in respect to the rod 40 may be utilized.

The rod 56 carries at its inwardmost end odometric measuring means 62. The precise construction of odometric measuring means 62 forms no part of the present invention since a wide variety of such odometric measuring means and tachometric means are commercially available at the present time. However, for the purposes of the present invention the odometric measuring means 62 should be provided with a slit 64 within which an edge 66 of the web 12 of cloth may be received. The odometric measuring means should include means for frictionally engaging the web 12 within the slit 64. As the web 12 moves through the slit 64, the linear dimension passing through such slit 64 is recorded on the dial 68. This may be accomplished by coupling means in the slit 64 which engages the web 12 with a gear train which registers on the dial 68.

The operation of the web measuring table 10 of the present invention is as follows:

For measuring relatively short lengths of cloth, the wing nut 48 may be securely tightened so that the juxtaposed faces of the discs 36 and the disc 30 are fixedly engaged with each other. Thus, the wing nut 48 can be tightened to the extent that the faces 34 of disc 30 engage their juxtaposed faces 42 of the discs 36 to the extent that the discs 36 and 30 comprise a rigid member. In this disposition, the web measuring table is especially suitable for measuring the length of fabrics when the same are at a uniform height above the uppermost surface of the table.

When the height of the web 12 above the uppermost surface of the table is non-uniform, as when the web 12 is continuously advanced for an extended time (this resulting in a gradual reduction of the amount of material carried on the trunnions 14) the length measuring means 20 should be adjusted so as to follow the change in height of the web 12 above the uppermost surface of the table. This can be accomplished by adjusting the tension exerted by the wing nut 48. Thus, by loosening the wing nut 48 somewhat, the rod 40 may be supported due to the frictional contact between the friction faces 34 of circular disc 30 and the juxtaposed friction faces 42 of discs 36, without such support interfering with the pivotal movement of the rod 40 about the bolt 44 responsive to the varying height of the web 12 above the table. Thus, the change in disposition of the odometric measuring means 62 responsive to the web 12 is such as to overcome the frictional forces between the faces 34 of circular disc 30 and their juxtaposed faces 42 of circular discs 36.

The web measuring table 10 may be used to measure webs of different widths. This is readily accomplished by moving the rod 56 towards or away from the web 12, as required.

The web measuring table of the present invention is of relatively low cost construction, is efficient, compact, and easy to repair. It will accommodate to a wide variety of sizes, shapes, and materials of webs.

In the embodiment 70 of the present invention there is shown a cloth cutting table 72 on which is movably mounted the spreader 74. The spreader 74 is provided with sheave-casters 76, which allow the spreader 74 to be moved on the uppermost edge of each of the pair of tracks 78 which are disposed at the sides of the cloth cutting table 72. Thus, in the illustrated embodiment, the tracks 78 comprise angle members fixedly secured to the underside of table top 80.

The webs of material 82, which are to be cut into patterns, are disposed in superposed relationship on top of the table top 80. Each web 82 is deposited in firm smooth disposition from the spreader 74, as the spreader 74 traverses the tracks 78.

The spreader 74 comprises a frame 84 consisting of end elements, with the frame 84 carrying a plurality of rotatably mounted spindles or rollers 86 over which the web 82 is guided. The rollers 86 serve to align the web 82 to provide tension thereto, so that the web 82 is delivered from the spreader 74 in flattened and smoothed disposition.

The length measuring means 88, which may be identical to the length measuring means 20 of the embodiment of Figures 1 through 5 is clamped by means of the clamp 90 to the frame 84 of spreader 74. The post 92 carries the circular disc 94 which is disposed intermediate the discs 96, the disc 94 being maintained aligned with the discs 96 by means of the bolt and wing nut 98.

The discs 96 are secured to the rod 100 which carries the sleeve 102 in which the rod 104 which carries the odometric measuring means 106 is carried. Since the web 82 may move very rapidly through the spreader 74, and then may stop suddenly, the frictional engagement between the odometric measuring means 106 and the web 82 should be such that no movement of the gear train within the odometric measuring means attributable to inertia should be possible. Thus, the frictional engagement should be such that the odometric measuring means responds to the slightest movement of the web 82 but stops immediately when the web 82 stops.

Since the web 82 traveling through the spreader 74 may be at different relative heights to the frame 84, depending upon the particular construction of the spreader, the speed with which the web is moved through the spreader, and the nature of the web material, it is desirable that the wing nut and bolt 98 should be somewhat slack so that the length measuring means 88 may compensate for such variations in height. This is readily accomplished, as has heretofore been explained, since the friction surfaces on the juxtaposed faces of the discs 94 and 96 will provide such accommodation.

The present invention may be embodied in other specific forms without departing from the spirit or essential attributes thereof and, accordingly, reference should be made to the appended claims, rather than to the foregoing specification as indicating the scope of the invention.

I claim:

1. A web measuring table which includes a web supporting table top, means for delivering a web to said table top, and means for measuring the length of said web while said web is supported on said table top, said measuring means being clamped above said table top, said measuring means including odometric means for engaging an edge of the web being measured, said odometric means being carried on the end of a shaft, and support means for said odometric means, said support means including means for selectively clamping the shaft carrying said odometric means a desired distance from the edge of said table top, and means for maintaining said odometric means above said table top.

2. A web measuring table which includes a web supporting table top, means for delivering a web to said table top, said last-mentioned means delivering said web to said table top at a varying height above said table top during the course of the delivery, and means for measuring the length of said web clamped above said table top, said measuring means including odometric means for engaging an edge of the web being measured, and support means for supporting said odometric means above said table top, said support means including means for selectively clamping said odometric means a desired distance from the edge of said table top, and accommodation means for automatically varying the height of said odometric means above the table top to correspond with the height of the edge of the web which is engaged by the odometric means at any given instant during the course of the delivery of the web from the means for delivering the web.

3. A web measuring table in accordance with claim 2 in which the accommodation means comprises a joint having juxtaposed friction faces, and means for varying the clamping pressure intermediate said juxtaposed friction faces.

4. A web measuring table in accordance with claim 3 in which the odometric means comprises a slotted odometer, with the slot of said odometer receiving the edge of the web, and with said odometer including indicia members for directly reading the length of the web which has passed through the slot in said odometer.

5. A web measuring table in accordance with claim 2 which includes spreader means movable above the web supporting table top for spreading the web onto the table top, with the measuring means being clamped to one side of the spreader means, with the odometric means engaging the web above the table top while the web is passing through the spreader means.

References Cited in the file of this patent

UNITED STATES PATENTS

| | | |
|---|---|---|
| 230,809 | Pfleager | Aug. 3, 1880 |
| 597,836 | Carpenter | Jan. 25, 1898 |
| 883,577 | Schultz | Mar. 31, 1908 |
| 1,593,160 | Cloud | July 20, 1926 |